United States Patent
Coon et al.

(10) Patent No.: US 11,547,093 B2
(45) Date of Patent: Jan. 10, 2023

(54) PROCESS OF USING ARKANSAS NET ENERGY FORMULATIONS OF FEED INGREDIENTS FOR BROILER PRODUCTION

(71) Applicant: BOARD OF TRUSTEES OF THE UNIVERSITY OF ARKANSAS, Little Rock, AR (US)

(72) Inventors: Craig Nelson Coon, Walker, MO (US); Katie Michelle Hilton, Fayetteville, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 847 days.

(21) Appl. No.: 16/513,319

(22) Filed: Jul. 16, 2019

(65) Prior Publication Data

US 2020/0015457 A1    Jan. 16, 2020

Related U.S. Application Data

(60) Provisional application No. 62/698,378, filed on Jul. 16, 2018.

(51) Int. Cl.
*A01K 29/00*     (2006.01)
*A01K 39/01*     (2006.01)
*A01K 5/00*      (2006.01)
*G05B 23/02*     (2006.01)

(52) U.S. Cl.
CPC .............. *A01K 29/005* (2013.01); *A01K 5/00* (2013.01); *A01K 39/01* (2013.01); *G05B 23/0294* (2013.01); *Y02P 60/87* (2015.11)

(58) Field of Classification Search
CPC ........ A01K 29/005; A01K 5/00; A01K 39/01; G05B 23/0294; Y02P 60/87
See application file for complete search history.

(56) References Cited

PUBLICATIONS

J. Noblet, H. Fortune, X. S. Shi, S. Dubois, Prediction of Net Energy Value of Feeds for Growing Pigs, Feb. 1, 1994, Journal of Animal Science, vol. 72, Issue 2, pp. 344-354 (Year: 1994).*

D. Ning, J. M. Yuan, Y. W. Wang, Y. Z. Peng, and Y. M. Guo, The Net Energy Values of Corn, Dried Distillers Grains with Solubles and Wheat Bran for Laying Hens Using Indirect Calorimetry Method, Feb. 2014 (Year: 2014).*

Zhongchao Li, Hu Liu, Yakui Li, Zhiqian Lv, Ling Liu, Changhua Lai, Junjun Wang, Fenglai Wang, Defa Li & Shuai Zhang, Methodologies on estimating the energy requirements for maintenance and determining the net energy contents of feed ingredients in swine: a review of recent work, May 16, 2018 (Year: 2018).*

(Continued)

*Primary Examiner* — Kathleen I Alker
*Assistant Examiner* — Nicole Paige Maccrate
(74) *Attorney, Agent, or Firm* — Crowe & Dunlevy, P.C.

(57) ABSTRACT

This invention relates generally to a process of using Arkansas net energy formulations of feed ingredients for broiler production. In calculating energy requirements, the invention accounts for the heat generated due to maintaining body composition as well as the energy accretion from gain. The process is configured be incorporated into and utilized by a system for formulating feed rations.

16 Claims, 9 Drawing Sheets

(56) References Cited

PUBLICATIONS

Armsby, H. P., "Net Energy Values of Alfalfa Hay and of Starch", J. Agric. Res. 15, Nov. 4, 1918, 269-286.
Emmans, G. C., "Effective energy: a concept of energy utilization applied across species", Br. J. Nutr., (1994) 71, 801-821.
Fraps, G. S., "Composition and productive energy of poultry feeds and rations", Texas Agric. Exp. Stn. Bull.678, Feb. 1946.
Fraps, G.S., "The Utilization of the Energy of Feed by Growing Chickens," Texas Agric. Exp. Stn., Bull. 571, Mar. 1939.

* cited by examiner

PROCESS OF USING ARKANSAS NET ENERGY FORMULATIONS OF FEED INGREDIENTS FOR BROILER PRODUCTION

CROSS REFERENCE TO RELATED APPLICATIONS

This application claims the benefit of U.S. Provisional Patent Application Ser. No. 62/698,378 entitled Process of Formulating Energy Requirements of Feed Ingredients for Broiler Production filed on Jul. 16, 2018, and incorporates said provisional application by reference in its entirety into this document as if fully set out at this point.

BACKGROUND OF THE INVENTION

1. Field of the Invention

This invention relates generally to a process of using Arkansas net energy formulations of feed ingredients for broiler production.

2. Description of the Related Art

Feed ingredients are one of the highest costs of poultry production, with energy being the major component of this cost. Gross energy (GE) of feed is not completely utilized by birds. As dietary energy passes through the gastrointestinal tract of the broiler, a portion of the calories will be lost, and additional energy is lost as fecal and urinary energy. The portion left is known as metabolizable energy (ME) and is currently used to formulate poultry diets due to its relative ease of calculation. The ME of feeds can be further refined to net energy (NE), which accounts for heat increment (HI) energy loss. Heat increment while difficult to assess, is a term used to encompass energy lost during ingestion, digestion, metabolism, and excretion. The benefit of refining the flow of energy to net energy is that the dietary energy remaining is the net energy of maintenance and production. The dietary net energy is a precise energy value that the bird uses for production, whether the energy is for eggs or meat, and the unseen costs of maintenance. Maintenance can be defined as the energy required to maintain body temperature, organ function and overall health of the bird.

Currently all poultry diets are formulated on an ME basis, although this is not the ultimate form of energy the bird uses for maintenance and production, where NE is better utilized. NE systems for feed formulation have been utilized for over 70 years in other agriculture production systems, with multiple means of measure. The original NE system uses the classical equation of NE kcal/kg=ME−HI. The productive energy equation (PE) uses the equation of PE kcal/kg=NEg (Net energy gain)+NEm (Net Energy maintenance), and the effective energy (EE) equation is calculated as EE kcal/kg=1.17×Apparent Metabolizable Energy (AME) corrected for zero nitrogen balance (AMEn)−(10×% Crude Protein)−580.

However, the modern broiler is growing at a rapid rate generating tremendous amounts of heat. A sensitive NE energy system is needed to measure body heat production primarily caused by maintenance and accretion of myofibrillar and sarcoplasmic protein by optimizing intake of digestible amino acids and energy. As noted above, the classic way to calculate NE of feed is to determine ME and subtract the HI. The classic NE method only assesses the value of HI which accounts for a small portion of dietary energy that is lost from ME. The classic way of analyzing NE can be misleading as more calorie efficiency (NE/ME) is given to fat deposition than lean mass deposition. Classic NE does not take into consideration the type of production or gain that is occurring in the animal and mainly penalizes protein accretion because of HI generated from nitrogen and carbon loss through uric acid production. Protein calories should be more important than fat calories for meat production and will be considered in the overall NE equation for predictive calorie value of ingredients.

It is therefore desirable to provide an improved process using Arkansas net energy formulations of feed ingredients for broiler production that overcomes the shortcomings of the prior processes.

It is further desirable to provide a process for formulating broiler diets on a NE basis that accounts for energy lost as heat and more accurately predicts body weight gain and feed conversion ratios over other forms of dietary energy.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in a first aspect, the invention relates generally to a process of using Arkansas net energy formulations of feed ingredients for broiler production. In calculating energy requirements, the invention accounts for the heat generated due to maintaining body composition as well as the energy accretion from gain. The process is configured to be incorporated into and utilized by a system for formulating feed rations. The process calculates energy requirements by NEm+NEg, where NEm is net energy of maintenance, and where NEg is net energy of gain. The total net energy is determined from both broiler body composition gain provided by DEXA and NEm equals HP minus HI determined with indirect calorimetry.

In general, in a second aspect, the invention relates to a biomarker utilized for predicting energy requirements for feed ingredients is body weight or metabolic body weight of broilers.

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
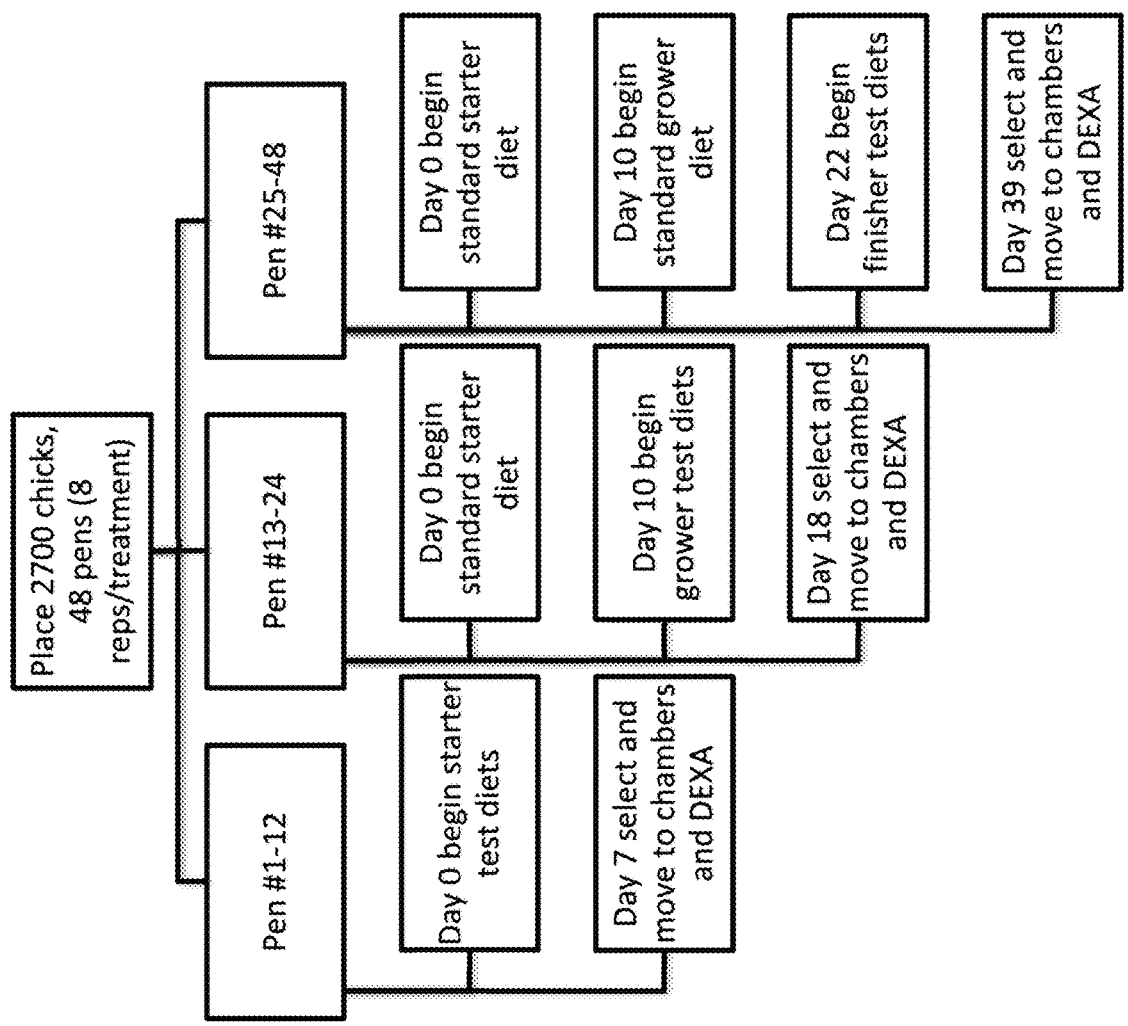
FIG. 1 is a flow chart illustrating the treatment plan in accordance with an illustrative embodiment of the invention disclosed herein.

While this invention is susceptible of embodiment in many different forms, there is shown in the drawings, and will herein be described hereinafter in detail, some specific embodiments of the invention. It should be understood, however, that the present disclosure is to be considered an exemplification of the principles of the invention and is not intended to limit the invention to the specific embodiments so described.

Utilizing the process of using Arkansas net energy formulations of feed ingredients for broiler production disclosed herein is a faster and more accurate approach to predict NE for ingredients compared to the swine NE approach. The process of using Arkansas net energy formulations of feed ingredients uses a 24-hour window for HP measurements compared to swine NE studies requiring week long time periods in chambers. The swine industry currently utilizes the NE system; however, they utilize a comparative slaughter method, which becomes more of a productive energy method. Predicting NE with the process of formulating energy requirements disclosed herein is more accurate than classical NE methodologies by accounting for the heat generated due to maintaining body composition as well as the energy accretion from gain. The daily amount of energy needed to maintain body tissue is two-thirds of NE value for poultry.

The inventive process of using Arkansas net energy formulations of feed ingredients can be used to calculate Ark Net energy (ArkNE) as follows:

Net energy of gain (NEg) is the energy that is contained within the body tissue gain during a specific time period.

$$\text{NEg (determined by DEXA)} = \text{protein gain (g)} \times 5.66 \text{ kcal/g protein} + \text{fat gain (g)} \times 9.35 \text{ kcal/g fat} \quad \text{(Equation 1)}$$

Total heat production (HP) is allocated to net energy maintenance (NEm), heat increment (HI) and activity. HP is determined by indirect calorimetry utilizing the following equations:

$$\text{HP and Fasting HP (kcal/d)} = 3.871 \, VO_2 \, (L/d) + 1.195 \, VCO_2 \, (L/d) \quad \text{(Equation 2)}$$

$$\text{HI} = \text{HP} - \text{Fasting HP} \quad \text{(Equation 3)}$$

$$\text{HP} = \text{NEm} + \text{HI} \quad \text{(Equation 4)}$$

The classical way of calculating NE is to determine metabolizable energy (ME) and HI. HI data is based on measuring HP unique to feed digestion and metabolism. The conversion from ME to NE is calculated:

$$\text{NE (kcals/kg)} = \text{NEg} + \text{NEm} \quad \text{(Equation 5)}$$

NE has not been considered as an important method of expressing broiler energy requirements mainly because the industry uses highly digestible corn-soy diets with low fiber and diets do not contain high HI components. The classic NE equation only takes into account the heat increment. Since commercial broiler diets do not contain a high fibrous component, more information about the type and amount of gain for broilers is needed in order to formulate on a NE basis.

$$\text{NE} = \text{Apparent ME (AME) intake (kcal/kg)} - \text{HI} \quad \text{(Equation 6)}$$

Determination of ArkNE Equation:

Knowing NEm and NEg provides information about broiler performance, body composition and type of gain, not just information about the small indigestible fraction difference for HI. Conversion from the classical NE system to the Ark NE equation is as follows:

Rearrange Equation 4:

$$\text{NEm} = \text{HP} - \text{HI} \quad \text{(Equation 7)}$$

$$\text{ArkNE} = \text{NEm} + \text{NEg} \quad \text{(Equation 8)}$$

Total NE is determined from both body composition gain (provided by DEXA) and NEm is HP minus HI determined with indirect calorimetry.

Utilizing indirect calorimetry to determine NEm and DEXA to determine NEg together (NEm+NEg) as disclosed herein provides valuable information about broiler genetics, broiler performance and type of gain. Utilizing the two (2) tools together provides more understanding about NE diets and not just about a small indigestible fraction differences made up by HI. Taking advantage of the heat production information that comes with NE utilization from genetics and diet with appropriate environment is a further advantage of the process disclosed herein that uses ArkNE formulation that was not considered by the classic NE to reach maximum production of quality diet formulation.

Examples

The process of using Arkansas net energy formulations of feed ingredients for broiler production disclosed herein is further illustrated by the following examples, which are provided for the purpose of demonstration rather than limitation.

Experimental design is based on twelve (12) chambers. The process disclosed herein is based on using a regression showing amino acid deposition through three (3) concentrations of amino acids for each feeding period. With twelve (12) chambers, two (2) corn and two (two) soybean meal (SBM) samples can be evaluated with two (2) reps each and three (3) amino acid (AA) concentrations.

Experimental Diets:

Two (2) test diets will be developed for each feeding phase. Two (2) different samples of corn or two different SBM will be evaluated for starter (0-10 d), grower (10-22 d) and finisher (22-42 d) feeding periods. In separate corn and SBM evaluation studies, the highest concentration of analyzed GE and ME (predicted from NIR) from the test corn samples will be utilized as the control for each study conducted. The highest concentration of lysine/CP/kcal for SBM will be utilized as the control SBM when evaluating the SBM samples. The control corn or control SBM selected Each of the corn samples will be fed equally on a percentage basis as determined by the control corn. Each of the SBM samples will be fed equally on a percentage basis as determined for the control SBM.

Examples of a standard starter diet is fed on days 0-10 (3,008 kcals/kg, 21% CP), a standard grower diet is fed on days 10-22 (3,100 kcals/kg, 19% CP), and a standard finisher diet is fed on days 22-42 (3,200 kcals/kg, 18% CP). The test diets for each period will be formulated to 80% dLys/Mcal as the main nutrient specification, 100% dLys/Mcal, and 120% dLys/Mcal specifications (Table 1) (Example diets for 80, 100, 120 AA specs with constant ME for each feeder period).

TABLE 1

Experimental test diets

| | Starter | | | Grower | | | Finisher | | |
|---|---|---|---|---|---|---|---|---|---|
| Ingredient | Standard* % | 80% % | 120% % | Standard* % | 80% % | 120% % | Standard* % | 80% % | 120% % |
| Corn | 53.36 | 67.02 | 39.69 | 61.68 | 72.27 | 49.79 | 66.66 | 73.64 | 55.82 |
| Soybean meal | 39.61 | 27.83 | 51.39 | 32.04 | 22.94 | 42.29 | 27.89 | 21.99 | 37.3 |
| dicalcium phosphate | 1.76 | 1.87 | 1.65 | 1.67 | 1.76 | 1.58 | 1.49 | 1.55 | 1.4 |
| limestone | 0.94 | 0.96 | 0.92 | 0.89 | 0.91 | 0.88 | 0.82 | 0.83 | 0.81 |
| Corn oil | 3.1 | 1.13 | 5.07 | 2.52 | 1 | 4.23 | 1.96 | 1 | 3.56 |
| salt | 0.38 | 0.38 | 0.38 | 0.38 | 0.38 | 0.38 | 0.35 | 0.35 | 0.35 |
| DL-Methionine | 0.29 | 0.21 | 0.37 | 0.24 | 0.16 | 0.32 | 0.23 | 0.13 | 0.2 |
| L-lysine | 0.12 | 0.17 | 0.07 | 0.13 | 0.14 | 0.09 | 0.15 | 0.08 | 0.11 |
| choline chloride-60 | 0.15 | 0.15 | 0.15 | 0.15 | 0.15 | 0.15 | 0.15 | 0.15 | 0.15 |
| Arkansas trace mineral | 0.1 | 0.1 | 0.1 | 0.1 | 0.1 | 0.1 | 0.1 | 0.1 | 0.1 |
| Arkansas vitamin pre-mix | 0.1 | 0.1 | 0.1 | 0.1 | 0.1 | 0.1 | 0.1 | 0.1 | 0.1 |
| Kemin Mold curb-50% | 0.05 | 0.05 | 0.05 | 0.05 | 0.05 | 0.05 | 0.05 | 0.05 | 0.05 |
| selenium premix-0.06% | 0.02 | 0.02 | 0.02 | 0.02 | 0.02 | 0.02 | 0.02 | 0.02 | 0.02 |
| Monsanto sanoquin 6 etho | 0.02 | 0.02 | 0.02 | 0.02 | 0.02 | 0.02 | 0.02 | 0.02 | 0.02 |
| L-Threonine 98% | — | — | — | — | — | 0.01 | 0.01 | — | 0.01 |
| Calculated values | | | | | | | | | |
| ME | 3030 | 3030 | 3030 | 3080 | 3080 | 3080 | 3100 | 3100 | 3100 |
| CP | 23.24 | 18.78 | 27.71 | 20.33 | 16.84 | 24.22 | 18.77 | 16.42 | 22.29 |
| Crude fat | 5.62 | 3.97 | 7.26 | 5.23 | 3.97 | 6.66 | 4.80 | 4.00 | 6.14 |
| Crude Fiber | 2.32 | 2.20 | 2.44 | 2.24 | 2.15 | 2.34 | 2.20 | 2.14 | 2.29 |
| Calcium | 0.90 | 0.90 | 0.90 | 0.84 | 0.84 | 0.84 | 0.76 | 0.76 | 0.76 |
| non-phytate phosphorus | 0.45 | 0.45 | 0.45 | 0.42 | 0.42 | 0.42 | 0.38 | 0.38 | 0.38 |
| Chlorine | 0.28 | 0.28 | 0.28 | 0.27 | 0.28 | 0.28 | 0.26 | 0.26 | 0.26 |
| Dig Lysine | 1.27 | 1.11 | 1.52 | 1.09 | 0.87 | 1.31 | 1.00 | 0.80 | 1.20 |
| Dig Methionine | 0.60 | 0.47 | 0.73 | 0.53 | 0.40 | 0.64 | 0.49 | 0.37 | 0.50 |
| Dig C + M | 0.92 | 0.74 | 1.10 | 0.81 | 0.65 | 0.97 | 0.76 | 0.61 | 0.81 |
| Dig threonine | 0.80 | 0.64 | 0.96 | 0.70 | 0.57 | 0.84 | 0.65 | 0.56 | 0.78 |
| Linoleic acid | 3.18 | 2.17 | 4.20 | 2.93 | 2.16 | 3.82 | 2.66 | 2.18 | 3.49 |

*Standard diet will be fed to remaining pens not being selected from will be formulated in a corn soybean diet to provide: 1) 80% AA requirements for starter, grower and finisher diets with both AA levels and ME; 2) 100% AA requirements for starter, grower and finisher diets with both AA levels and ME; and 3) 120% AA requirements for starter, grower, and finisher diets with both AA levels and ME. During the feeding study designed for evaluating two (2) test corn samples (control corn used for formulation and test corn with same inclusion level), a commodity SBM from University Feed Mill will be utilized to complement with the test corn for formulation for each of the three 93) feeding periods. During the feeding study designed for evaluating two (2) different SBM samples (control SBM used for formulation and test SBM with same inclusion level), commodity corn will be separated at the University Feed Mill and utilized to complement each of the test SBM samples for formulation for each of the three (3) feeding periods. The control corn or control SBM will dictate the formulation inclusion levels utilized for all of the test corns or test SBM.

Birds and Housing—(FIG. 1):

Two-thousand seven hundred (2,700) Cobb 500 broilers will be placed in forth-eight (48) pens to start each NE study. Each treatment will be replicated eight (8) times and each replicate will consist of one (1) pen of sixty (60) birds (5.0 feet×10.0 feet, one-line drinker, ten (10) nipples). Twelve (12) hatched 1-day-old chicks will be utilized for initial body composition which will be determined using a dual energy X-ray absorptiometry (DEXA) scanner (General Electric, Madison, Wis.) with a small animal body software module (Lunar Prodigy from GE Encore version 12.2). Body Composition will be determined using DEXA before and after the gas exchange evaluation. The DEXA body composition will be used to determine the type of gain that occurs for the broilers in each of the treatments in terms of lean mass, protein and fat. The type of gain that occurs will be used to determine the feed value for NEg in Equation 1.

Pens 1 through 12 will immediately start the starter test diets (Two corn or SBM samples×3 dLys/Mcal concentrations, Table 1; example diets). While the remaining pens will start a standard starter diet until day 10. On day 10, pens 13 through 24 will start the grower test diets (Two corn or SBM samples×3 dLys/Mcal concentrations, Table 1; example diets), while remaining pens, 25 through 48 will start a standard grower diet. Finally, on day 22, the remaining pens 25 through 48 will start the finisher test diets (Two corn or SBM samples×3 dLys/Mcal concentrations, Table 1; example diets). The chicks will be fed standard starter (0-10 d), grower (11-21 d) and finisher (22-42 d) diets (Two corn or SBM samples×3 dLys/Mcal concentrations, Table 1; example diets). All birds will be provided feed and water ad libitum.

Figure 2:
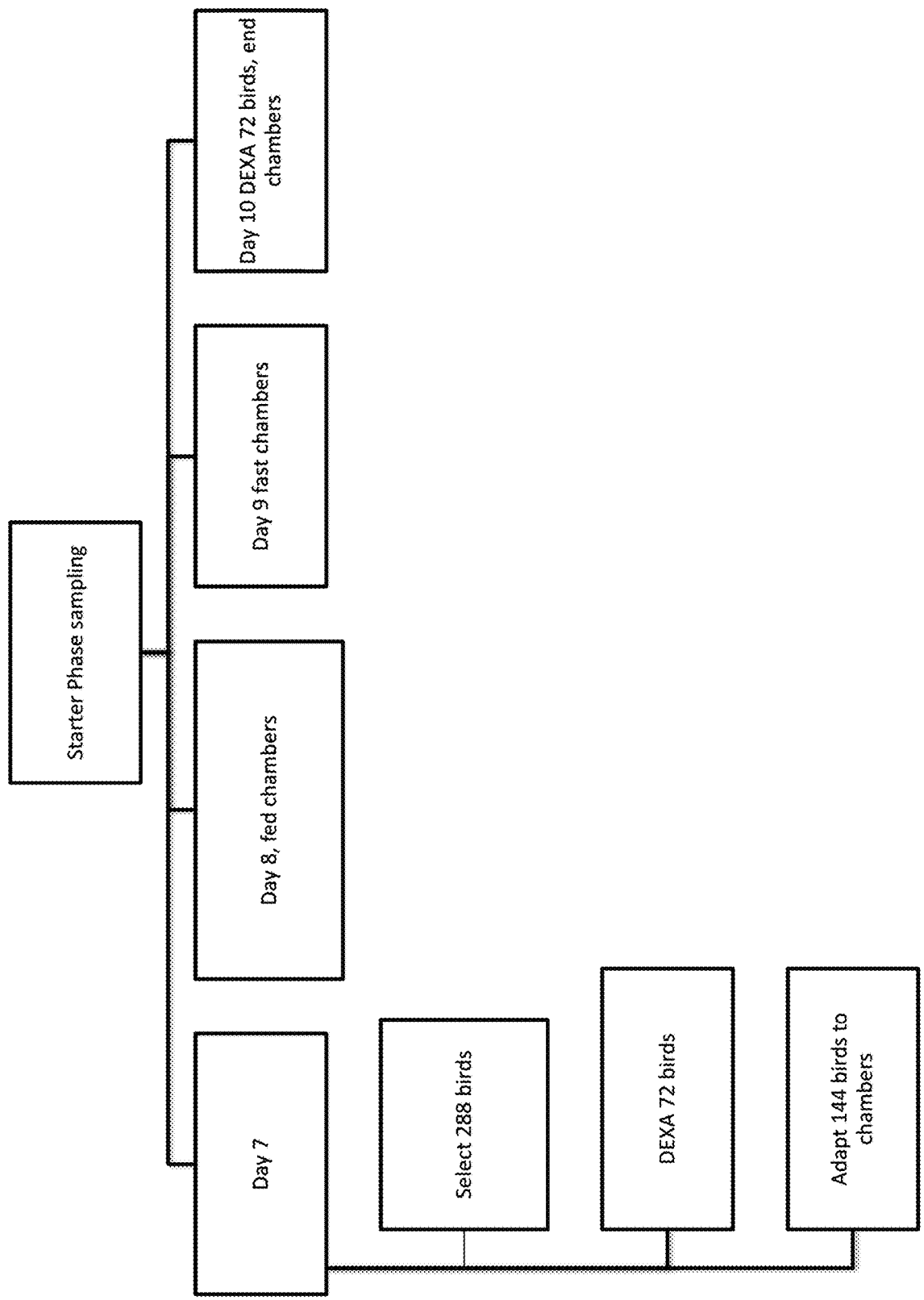
FIG. 2 is a flow chart illustrating a starter phase sampling schedule in accordance with an illustrative embodiment of the invention disclosed herein.

Determination of NE—Starter Phase (FIG. 2):

On day 7, two-hundred eighty-eight (288) chicks will be selected from the pens and placed on the starter test diets (FIG. 1, Table 1). One-hundred forty-four (144) broiler chicks on day 7 will be moved to the twelve (12) metabolic chambers and adapted for 24 hours (Two corn or SBM samples×2 chamber reps×3 dLys/Mcal concentrations). The chambers will be stopped and open for approximately two (2) hours for weighing birds and adding feed. The respiratory chambers work as an open flow calorimeter which is turned on one (1) hour prior to each experiment to heat up the pumps and analyzers. Before every experiment, the system will be calibrated with fixed known air gases concentration and nitrogen; the inputs are total body weight and flow LPM (liter per minute). The outputs of the system are $VO_2$, $VCO_2$, and the following parameters are calculated using Equations 2 through 4. In addition, seventy-two (72) broiler chicks (12 broiler chicks per treatment) will be humanly sacrificed by carbon dioxide inhalation and body composition determined. Heat production will be determined with the 8-day-old broilers for 24 hours, followed by a 24-hour fasted heat production determination on day 9. On day 10, seventy-two (72) broiler chicks (12 per treatment) will be humanely sacrificed by carbon dioxide inhalation and utilized for body composition by DEXA as described above.

Figure 3:
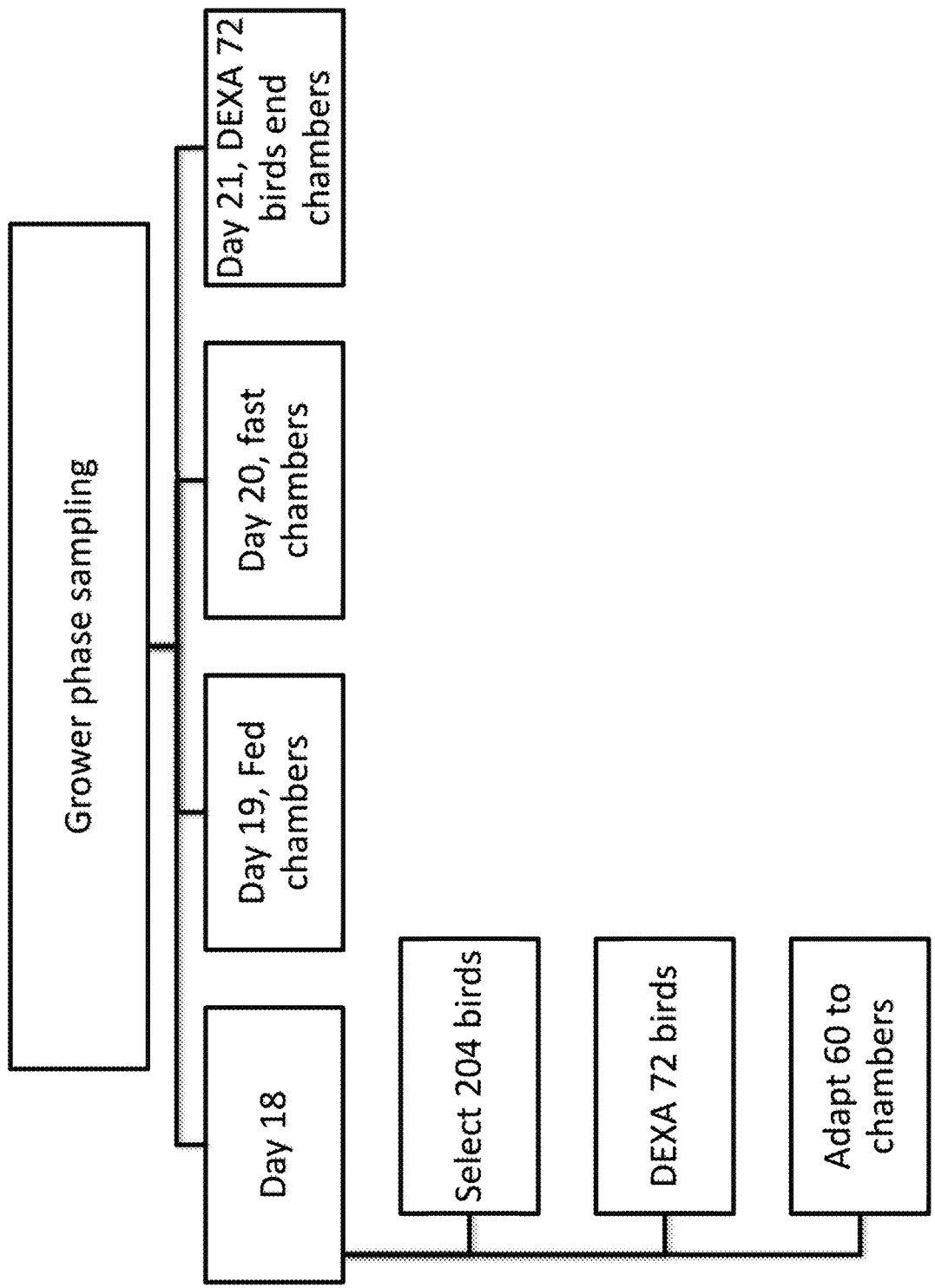
FIG. 3 is a flow chart illustrating a grower phase sampling schedule in accordance with an illustrative embodiment of the invention disclosed herein.

Determination of NE—Grower Phase (FIG. 3):

Two-hundred four (204) broilers will be selected on day 18 from the pens and placed on the grower test diets (FIG. 1, Table 1). Twelve (12) birds on day 11 will be utilized for initial body composition which is to be determined by DEXA. Another option to establish the initial body composition information for grower period is to use the body composition of broilers fed control (100% dLys/Mcal) determined on day 10 for the ending of the starter period. On day 18, sixty (60) birds will be moved to the twelve (12) metabolic chambers, as described above, and adapted for 24 hours and seventy-two (72) separate birds (12 broilers per treatment) will be humanly sacrificed by carbon dioxide inhalation and body composition determined by DEXA as described above. Heat production will be determined on day 19 for 24 hours, followed by a 24-hour fasted heat production determination on day 20. On day 21, seventy-two (72) broilers (12 broilers per treatment) will be humanely sacrificed by carbon dioxide inhalation and utilized for body composition by DEXA as described above.

Figure 4:
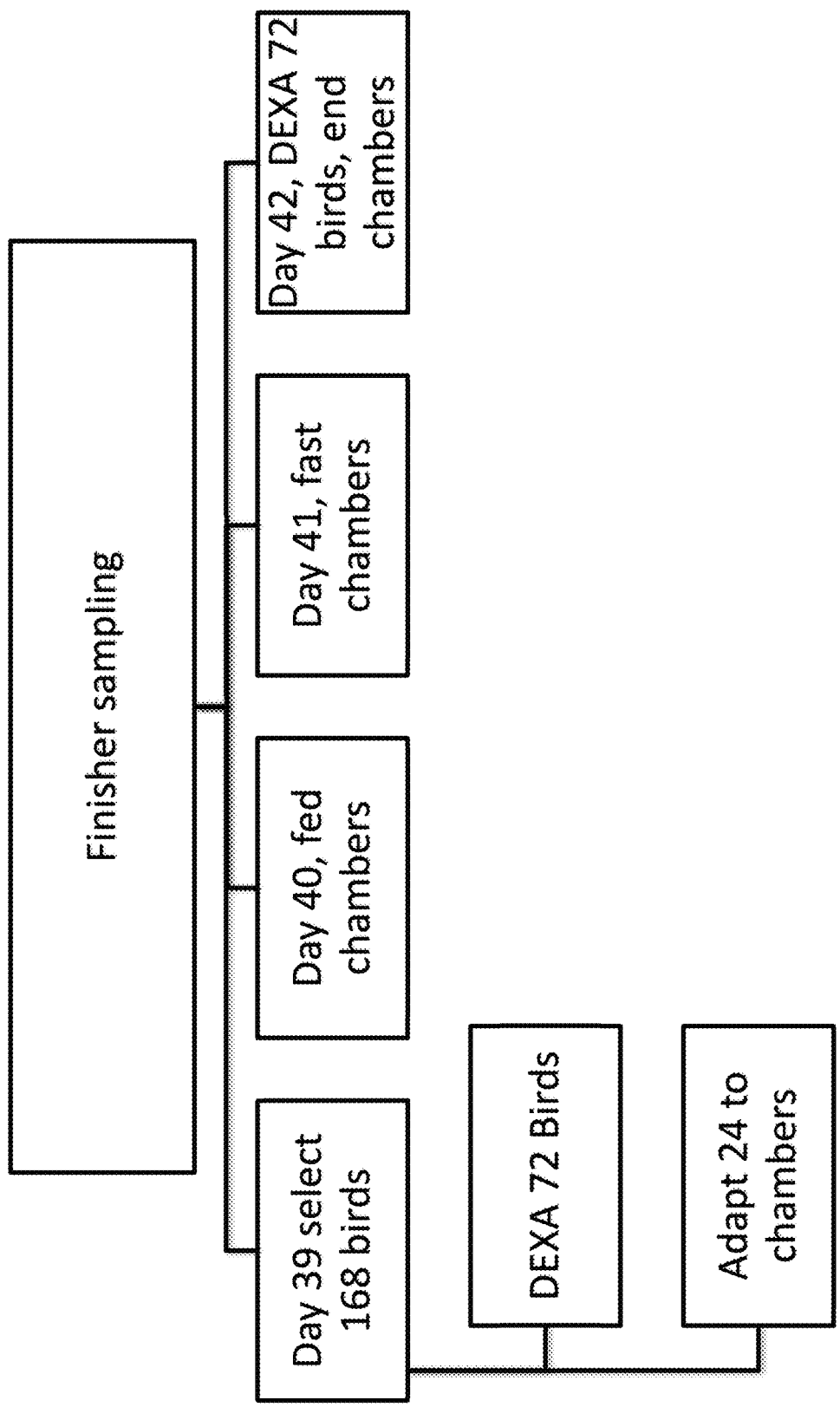
FIG. 4 is a flow chart of a finisher phase sampling schedule in accordance with an illustrative embodiment of the invention disclosed herein.

Determination of NE—Finisher Phase (FIG. 4):

One-hundred sixty-eight (180) broilers will be selected on day 39 from the pens and placed on the finisher test diets (FIG. 1, Table 1). Twelve (12) birds will be utilized for initial body composition which is to be determined by DEXA as described above. Another option to establish the initial body composition information for finisher period is to use the body composition of broilers fed control (100% dLys/Mcal) determined on day 21 for the ending of the grower period. On day 39, twenty-four (24) birds will be moved to the twelve (12) metabolic chambers (Appendix 2) and adapted for 24 hours and seventy-two (72) broilers (12 broilers per treatment) will be humanely sacrificed by carbon dioxide inhalation and body composition determined. Heat production will be determined on day 40 for 24 hours, followed by a 24-hour fasted heat production determination on day 41. On day 42, seventy-two (72) broilers (8 broilers per treatment) will be humanely sacrificed by carbon dioxide inhalation and utilized for body composition by DEXA.

All birds utilized for the study will be selected within one (1) standard deviation from the treatment mean body weight.

Individual Ingredient NE Determination:

Individual ingredient NE determination will be done initially with two (2) types of corn or two (2) types of soy (Two corn or SBM samples×3 dLys/Mcal concentrations, Table 1; example diets). The test ingredients, corn and soybean meal, will be analyzed with Near Infrared Reflectance (NIR) (Bruker, MA, USA). Multiple linear regression analysis will be performed on the data to determine the optimum or optimal functionality of the prediction model. Once the model is established, each repetition contributes to the digestible lysine per Mcal ratio, the more additions to this ratio the more robust the model will become in predicting using the process of formulating energy requirements for individual feed ingredients. Although, the process of formulating energy requirements is only exemplified herewith in connection with the twelve (12) chambers of initial trials with two (2) varieties of corn or two (2) varieties of soy at the same time, the inventive process is not so limited an may be utilized in more varieties of a single or multiple ingredients.

Figure 5:
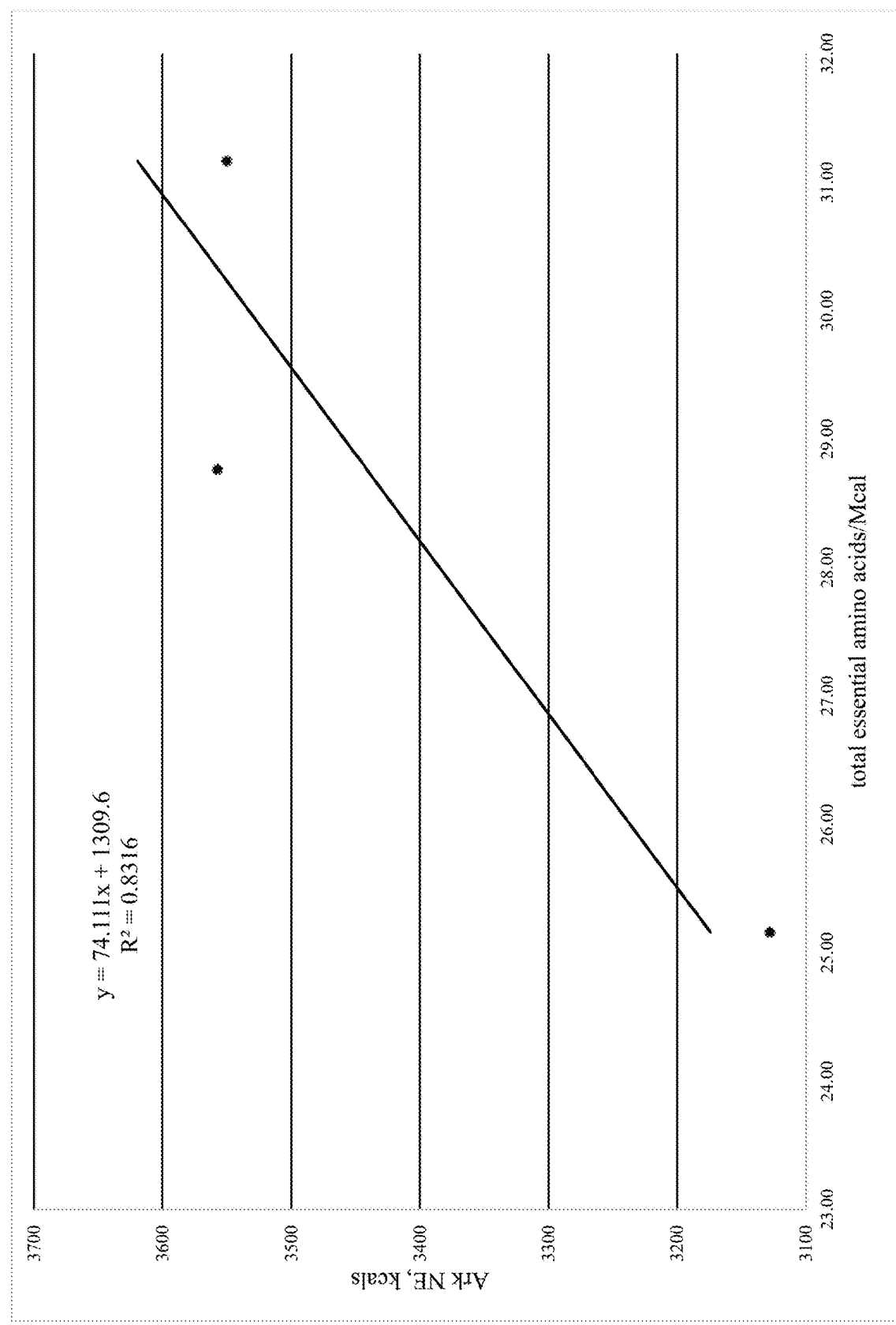
FIG. 5 is a graphical representation of simple linear regression of total essential amino acids in accordance with an illustrative embodiment of the invention disclosed herein.

Materials and Methods (Pilot Data):

The process of formulating energy requirements provided herein will calculate the NE value from Equations 1-8 above. Then, utilizing the inclusion level of corn and soybean meal in the complete diet (Tables 1-2) and total digestible amino acids (determined through ileal digestibility) per apparent metabolizable energy (AMEn) Mcal, a simple linear regression equation (FIG. 5; Table 2) will be calculated.

TABLE 2

Pilot data diet composition

| Diet | AMEn Mcal | Total Essential AA in diet g/kg, DM | Total Essential AA in diet per Mcal[1] g/Mcal | Corn Inclusion % | soy inclusion % | ARK NE[2] kcals |
|---|---|---|---|---|---|---|
| 1 | 3.132 | 78.8 | 25.16 | 70 | 18 | 3128 |
| 2 | 3.195 | 91.9 | 28.76 | 64 | 23 | 3557 |
| 3 | 3.199 | 99.7 | 31.17 | 58 | 32 | 3550 |
| Average | 3.18 | | | 64 | 24 | |

[1]Used as the predictor on the x-axis in graph 1.
[2]Used as the dependent variable on y-axis in graph 1.
Digestible lysine per Mcal has also been used as predictor and resulted in an $R^2$ of 0.71.

For this pilot data, individual ingredients were not available to be analyzed on the NIR, therefore the digestible amino acids in corn and soybean meal (Tables 2-3) is based on calculated values.

TABLE 3

Calculated digestible essential amino acids (EAA) in Corn and Soybean meal, pilot study.

|  | Corn g, dig | Soy g, dig |
|---|---|---|
| Lys | 1.2 | 20.8 |
| Met | 1.1 | 4.7 |
| M + C | 2.6 | 9.6 |
| Thr | 1.9 | 14.5 |
| Trp | 0.4 | 5.1 |
| Arg | 1.9 | 21.1 |
| Val | 2.5 | 17.8 |
| Leu | 5.5 | 29 |
| Ile | 1.7 | 16.8 |
| His | 1.5 | 9.7 |
| Phe | 2.1 | 19.4 |
| Total EAA | 22.4 | 168.5 |
| Avg. % inclusion in complete diet | 64% | 24% |
| total EAA, g dig | 14.34 | 40.44 |
| total EAA per Mcal | 4.48 | 12.64 |
| Ark NE value, kcals | 1641.61 | 2246.17 |

Based on the calculated values the average total essential amino acids in corn per Mcal is 4.48, while soybean meal is 12.64. Utilizing Equation 9 below (FIG. 5; Table 2), it can be determined the Ark NE value for corn is 1,641 kcals while the Ark NE value for soybean meal is 2,246 kcals.

$$Y = 74.11x + 1309.6 \quad \text{(Equation 9)}$$

Lastly, multiple types of biomarkers will be utilized collectively to determine the optimal regression equation. In this pilot data, the diets corn inclusion decreases as the total digestible amino acids per Mcal increases, as well as lipid calories decrease, and ultimately the amount of carbohydrates decreases.

Near Infrared Reflectance:

Major ingredients such as corn, soybean meal, wheat, vegetable oils and animal fats, and minor ingredients such as poultry by-product meal, wheat middlings and distiller's dried grain with solubles (DDGS) can be analyzed with NIR to determine gross energy (GE), proximate analysis components, NSPs and amino acids. The nutrient content can be used as predictors for the ArkNE of ingredients. NIR can be used to determine the content of percent digestible lysine (% digLys) and percent total digestible essential amino acids (% digTDEAA) available in the ingredient. The percent digestible lysine or the percent total digestible essential amino acids content of the ingredient can be used to obtain the Arkansas Net Energy value through a regression plot. The regression plot can be obtained using measured Ark Net Energy values from the methods described herein.

Figure 7:
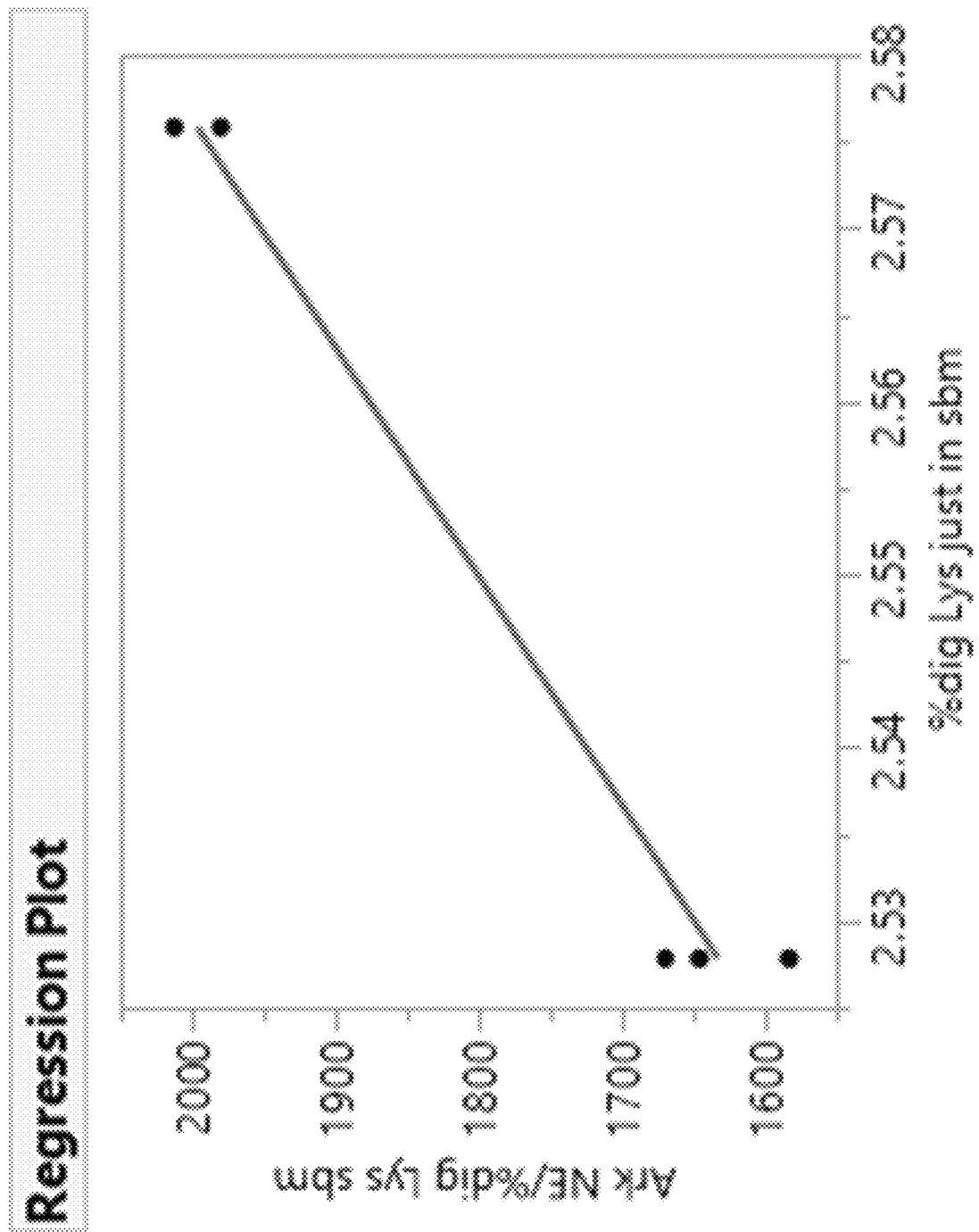
FIG. 7 is a graphical representation of simple linear regression of Arkansas Net Energy based on percent digested lysine in accordance with an illustrative embodiment of the invention disclosed herein.
Figure 8:
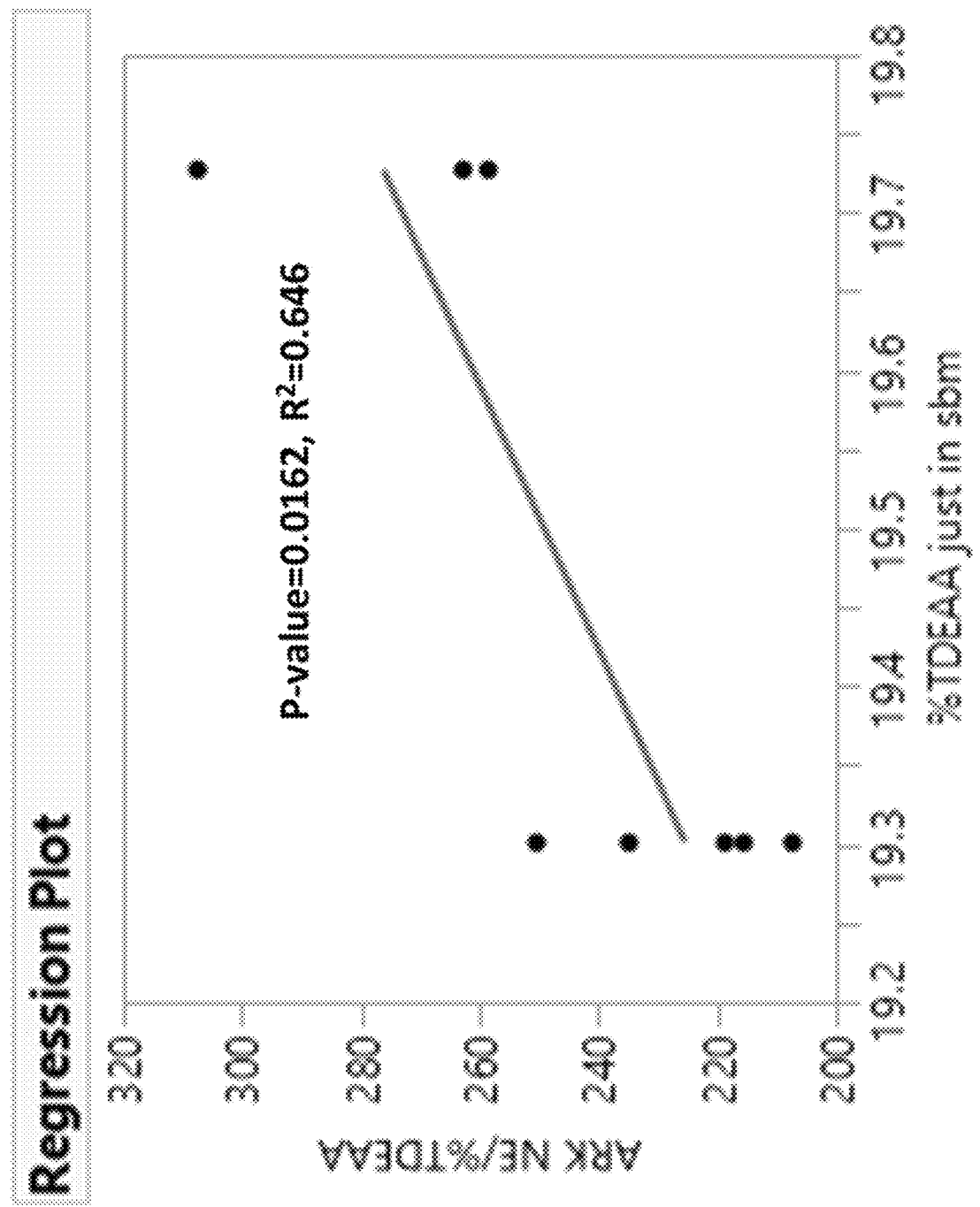
FIG. 8 is a graphical representation of simple linear regression of Arkansas Net Energy based on percent total digestible essential amino acids in accordance with an illustrative embodiment of the invention disclosed herein.

FIG. 7 shows a regression plot which can be used to predict the ArkNE based on the percent digestible lysine. The plot is created using % digLys values calculated for two types of soybean meal: 2.576, and 2.528 and the corresponding measured values of ArkNE: 1854, and 1527. The plot in FIG. 7 produced an $R^2$ value of 0.97 with a p-value of 0.0020. These valued indicated that 97% of the data is explained by this model. FIG. 8 shows a regression plot which can be used to predict the ArkNE based on the percent total digestible essential amino acids. The plot is created using % digTDEAA values calculated for two types of soybean meal: 19.73, and 19.303 and the corresponding measured values of ArkNE: 1854, and 1527. The plot in FIG. 8 produced an $R^2$ value of 0.64 with a p-value of 0.016. These values indicate that 67% of the data is explained by using the total digestible essential amino acids.

Figure 9:
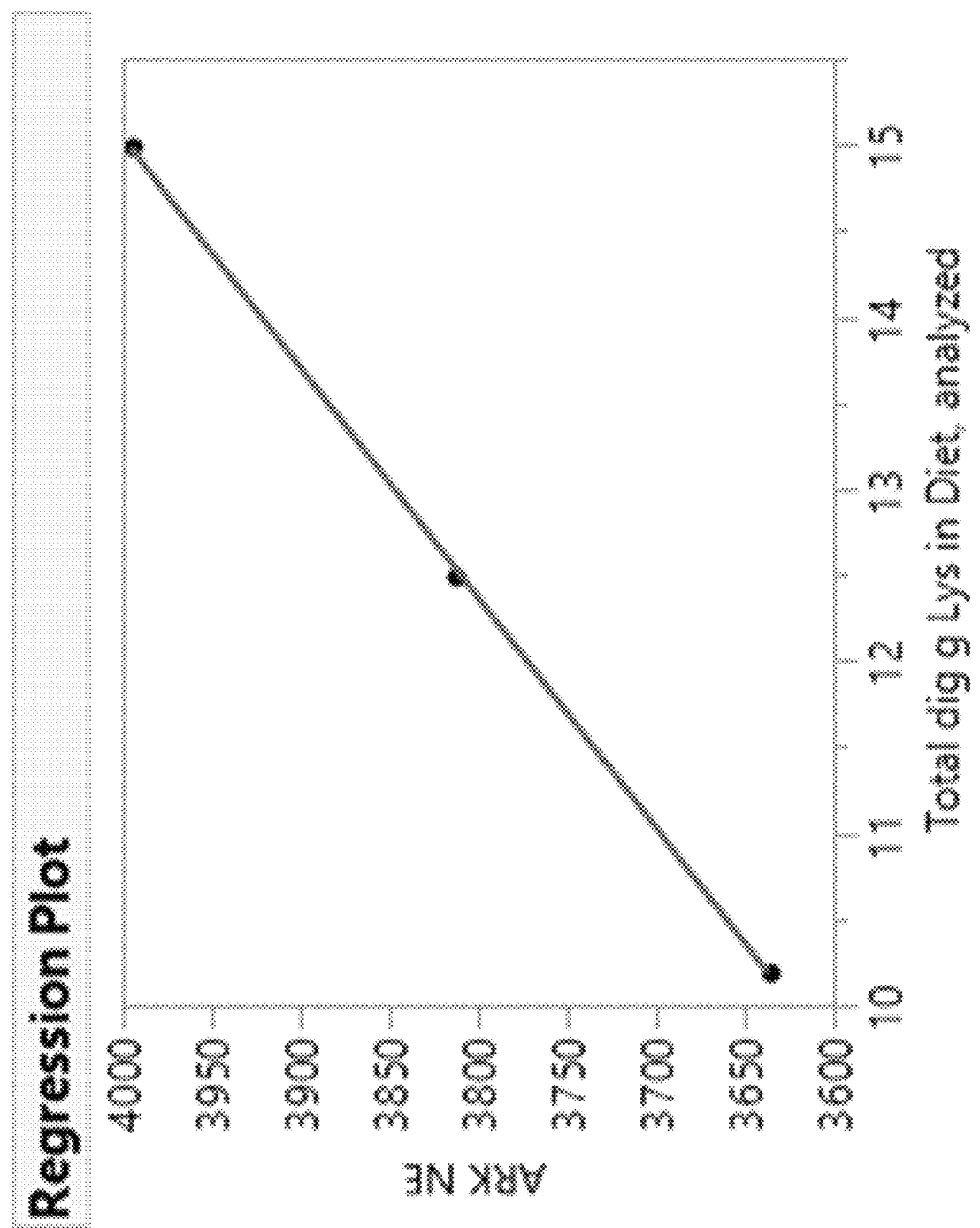
FIG. 9 is a graphical representation of simple linear regression of Arkansas Net Energy for controlled temperature environments based on percent total digestible lysine.

FIG. 9 shows another regression plot. The regression plot in FIG. 9 is again based on measured values of ArkNE and percent total digestible lysine for ingredients. The ArkNE measurement for the plot was obtained by controlling the environment temperature that the broilers were grown in. The temperature and climate in which birds are grown has an effect on the nutritional qualities of the feed to increase efficiency. Four broiler trials were conducted two in a warmer climate, max temp 90 F, two in cooler temp, max temp 70 F. By knowing the temperature and or climate the broilers are grown in and the digestible lysine the predictability of Arkansas NE increases. In FIG. 9 $R^2 = 0.999$, $P < 0.001$. The model shown in FIG. 9 also shows that for every degree increase the Arkansas NE value changes 74.7 kcals.

Body Weight and Metabolic Body Weight:

A biomarker that can be utilized for predicting ArkNE for ingredients is body weight or metabolic body weight of broilers consuming the test feed.

Additional biomarkers may be evaluated for accurately predicting NE: non-starch polysaccharides (NSP), soluble and insoluble NSPs, digestible and non-digestible ileal and total tract NSPs; crude fiber, total tract digestible crude fiber; amino acids, digestible ileal AA; ether extract, digestible ileal ether extract; starch, ileal digestible starch.

Total Tract Nutrient Digestibility and Standard Ileal Digestibility (SID) Analysis:

A total of thirty (30) metabolic cages will be utilized for total tract nutrient digestibility (6 treatments×5 reps). AMEn will be analyzed for the thirty (30) metabolic cages during the evaluation time for each feeding period (starter day 5, grower day 19, finisher day 34). Approximately 120 grams of excreta will be collected, freeze dried, weighed for dry matter, ground and analyzed for gross energy in Parr Bomb calorimeter. The ME value will be corrected for nitrogen. Diets and excreta will also be analyzed for GE, N, and proximate analysis components such as crude fiber, crude fat, crude protein, starch, and NSP, as described below.

Metabolizable energy (ME) for each diet will be calculated as follows:

Marker (TiO$_2$) to be added to the diets at an inclusion level of 0.05%:

$$\text{AMEn, kcal/kg} = (GE_{diet} - GE_{excreta} \times (TiO_{2diet}/TiO_{2excreta}) - 8.22 \times (N_{diet} - N_{excreta} \times TiO_{2diet}/TiO_{2excreta}) \quad \text{(Equation 10)}$$

The ileum is defined as that portion of the small intestine extending from the Meckel's diverticulum to a point approximately four (4) to five (5) cm (40-50 mm) proximal to the ileo-cecal junction. At the end of each experiment the ileal content will be recovered from each bird at stored at −20° C. The samples will follow the same procedure as for the excreta. Ileal digestible amino acids will be calculated as follows:

Apparent Ileal Digestibility—

$$\text{AA digestibility} = (AA/Ti)d - (AA/Ti)i/(AA/Ti)d \times 100 \quad \text{(Equation 11)}$$

Where (AA/Ti)d equals the ratio of AA to titanium in diet, and where (AA/Ti)i equals the ratio of AA to titanium in ileal digesta.

Apparent digestibility data will be converted to SID values, using basal endogenous AA losses (BEL) for SID calculations. The BEL of AA for the standardization of apparent ileal digestibility (AID) will be obtained from assays using EHC (Table 4).

TABLE 4

Average basal endogenous crude protein and amino acid losses for standardization of apparent digestibility

| | Content in mg/kg DMI | | Content in mg/kg DMI | | Content in g/kg DMI | | Content in g/kg DMI |
|---|---|---|---|---|---|---|---|
| Crude protein | 9234 | | | Crude protein | 9.234 | | |

| Essential amino acids: | | Non-essential amino acids: | | Essential AA: | | Non-essential AA: | |
|---|---|---|---|---|---|---|---|
| Methionine | 79 | Cysteine | 169 | Methionine | 0.079 | Cysteine | 0.169 |
| Methionine + Cysteine | 257 | Glycine | 280 | Met + Cys | 0.257 | Glycine | 0.28 |
| Lysine | 255 | Serine | 1023 | Lysine | 0.255 | Serine | 1.023 |
| Threonine | 571 | Proline | 580 | Threonine | 0.571 | Proline | 0.58 |
| Tryptophan | 82 | Alanine | 301 | Tryptophan | 0.082 | Alanine | 0.301 |
| Arginine | 216 | Aspartic acid | 612 | Arginine | 0.216 | Aspartic acid | 0.612 |
| Isoleucine | 390 | Glutamic acid | 1037 | Isoleucine | 0.39 | Glutamic acid | 1.037 |
| Leucine | 381 | | | Leucine | 0.381 | | |
| Valine | 449 | | | Valine | 0.449 | | |
| Histidine | 209 | | | Histidine | 0.209 | | |
| Phenylalanine | 237 | | | Phenylalanine | 0.237 | | |

The correction of AID for BEL to obtain SID requires a table value for BEL. The data base for the BEL table should be consistent in the assay used for determination of BEL. Additionally, the AA content of the tested raw material is needed as the BELs are dependent on the AA intake and are expressed per kg dry matter intake (Equation 12), therefore analysis of major feed ingredients will be determined using the NIR and complete feeds will be analyzed for individual amino acids as well.

$$\text{SID coefficient (\%)} = \text{AID (\%)} + (\text{BEL of AA (g/kg DM intake)}/\text{AA content of raw material (g/kg)}) \times 100 \quad \text{(Equation 12)}$$

NSP Analysis:

NSP in the form of soluble and insoluble non-cellulosic polysaccharide (S-NCP and I-NCP) fractions will be analyzed for treatment diets, ileal digesta and excreta samples. Briefly, 5 ml of sodium acetate buffer (0.1M, pH 5) will be added to the ground sample (mesh size 1 mm) followed by serial enzymatic treatment for the starch removal process—100 µl of α-amylase (Temamyl 300 L, Novozymes North America Inc, Franklinton, N.C.) for 1 h (>90° C.) and 500 µl of amyloglucosidase (CAS: 9032-08-0, Megazyme Inc, Chicago, Ill.) for less than 16 hours at 55° C. Sample solution will then be centrifuged (2500 g, 4° C.). Supernatant will be collected (S-NCP fraction) and later will be precipitated out using ethanol (99%). The remaining pellet (I-NCP fraction) and the S-NCP fraction both will be acid hydrolyzed (12 M $H_2SO_4$). The hydrolysates will be utilized to determine NCP content (S-NCP and I-NCP) at monosaccharide levels in their alditol acetate forms using a gas chromatography-flame ionization detector (GC-FID). One (1) µl of the sample volume will be injected into GC. Typical chromatogram is shown in FIG. 6.

Gas chromatography specifications set will include column temperature maintained at 225° C. DB 225 column will be used (Part no. 22-2231, Agilent Santa Clara, Calif.). Helium will be used as carrier gas, pressure set at 71.6 kPa, total flow 48.8 ml/min, column flow 0.90 ml/min and purge flow 3 ml/min. Sample split ratio will be maintained at 50 percent. FID temperature will be set at 250° C. Gases used for FID will include hydrogen (40 ml/min) and oxygen (400 ml/min) and the make-up gas used will be nitrogen (set at 30 ml/min).

Figure 6:
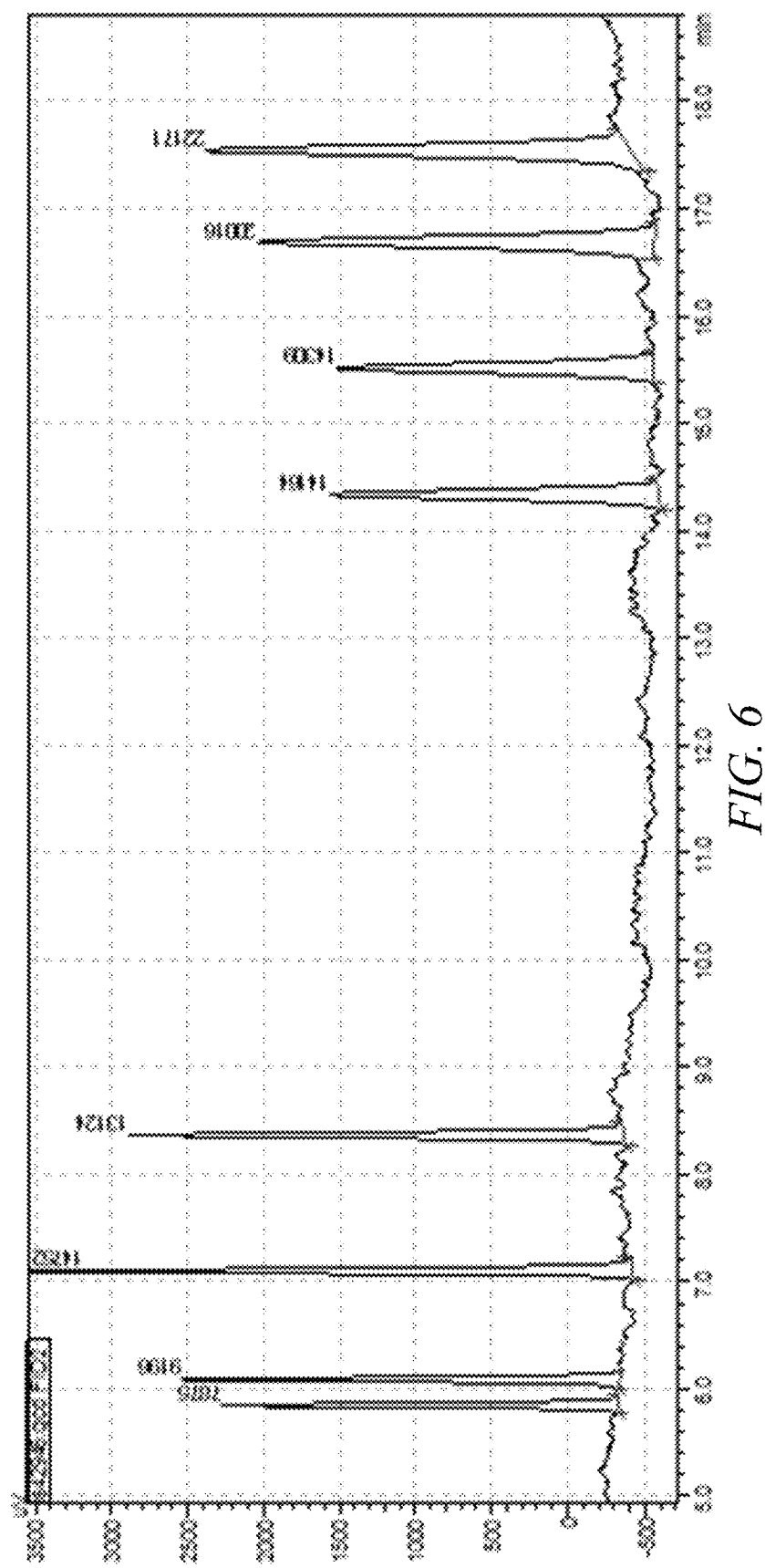
FIG. 6 is a chromatograph showing peaks (with the intensity/area values given adjacent to each peak) from left to right are rhamnose, fructose, arabinose, xylose, mannose, galactose, glucose and myoinositol peaks, respectively, in their alditol acetate forms.

FIG. 6 shows peaks (with the intensity/area values given adjacent to each peak) in chromatogram from left to right are rhamnose, fucose, arabinose, xylose, mannose, galactose, glucose and myoinositol peaks, respectively, in their alditol acetate forms.

The following equation will then be utilized to calculate the % monosachharide levels in NCP:

$$(CFm \times Pm \times Wi \times 100 \times 0.89)/(Pi \times Ws) \quad \text{(Equation 13)}$$

Where CFm equals the correction factor for monosaccharide to account for sugar losses during hydrolysis, and derivatization; where Pm equals the peak area for monosaccharide in sample solution; where Pi equals the peak area for internal standard; where Wi equals the weight of internal standard; where Ws equals the weight of the sample (dry matter, mg); and where 0.89 equals recalculation factor (for changing monosaccharides into polysaccharides).

Digestibility coefficients (DC) of NCP for digesta or excreta will be calculated based on the marker concentration in diets, digesta and excreta using the following equation:

$$\text{DC of NCP (digesta or excreta)} = 1 - [(Ci/Co) \times (Xo/Xi)] \quad \text{(Equation 14)}$$

Where, Ci is the concentration of $TiO_2$ present in diet; where Co is the concentration of $TiO_2$ present in digesta or excreta; where Xo is the NCP content in digesta or excreta; and where Xi is the NCP content present in the diet. All values for Ci, Co, Xo and Xi will be expressed as % DM basis. DC values for total NCP and for constituent NCP monosaccharides will be determined.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A process of using Arkansas net energy formulations of feed ingredients for livestock production, the process comprising the steps of:
    obtaining one or more livestock feeds;
    measuring a gross energy of the one or more livestock feeds;
    feeding the one or more feeds to livestock;
    measuring a net energy gain of the livestock;
    obtaining a net energy maintenance;
    calculating Arkansas net energy by adding the net energy gain to the net energy maintenance;
    using the calculated Arkansas net energy to determine feed energy requirements for the livestock;
    using the feed energy requirements to determine an amount of the one or more livestock feeds to give to the livestock; and,
    feeding the determined amount of the one or more livestock feeds to the livestock.

2. The process of claim 1 further comprising the step of calculating a feed conversion ratio for the one or more feeds by comparing the gross energy to the Arkansas net energy, wherein the conversion ratio is used to calculate energy requirements of the one or more feeds.

3. The process of claim 1 wherein the net energy of maintenance is obtained by:
    measuring a heat production;
    measuring a fasting heat production;
    subtracting a heat increment from the heat production, wherein the heat increment is obtained by subtracting the fasting heat production from the heat production.

4. The process of claim 3 wherein the heat production and fasting heat production are measured with indirect calorimetry.

5. The process of claim 1 wherein the net energy gain of the livestock is separated into a protein gain and a fat gain.

6. The process of claim 5 wherein the net energy gain is measured with using a dual energy X-ray absorptiometry scanner.

7. The process of claim 1 wherein the livestock are broilers.

8. The process of claim 7 wherein the percent total digestible lysine and the percent total digestible essential amino acids measured from the one or more feeds are combined with the Arkansas net energy to calculate the feed energy requirements for the one or more feeds.

9. The process of claim 1 wherein proximate analysis components, non-starch polysaccharides, and amino acids of the one or more feeds are measured.

10. The process of claim 9 wherein the percent total digestible lysine and the percent total digestible essential amino acids of the one or more feeds are measured with near infrared reflectance.

11. The process of claim 1 wherein the gross energy of the one or more feeds are measured with near infrared reflectance.

12. The process of claim 1 wherein the livestock are in a temperature-controlled environment.

13. A process for using Arkansas net energy formulations of feed ingredients for broiler production, the process comprising the steps of:
 obtaining one or more feeds;
 measuring the gross energy, percent total digestible lysine, and the percent total digestible essential amino acids measured from the one or more feeds;
 feeding the one or more feeds to one or more broilers;
 measuring a net energy gain of the one or more broilers, wherein the net energy gain of the one or more broilers is separated into a protein gain and a fat gain, wherein the net energy gain due to protein gain is prioritized;
 obtaining a net energy maintenance, wherein the net energy of maintenance is obtained by measuring a fasting heat production;
 calculating Arkansas net energy by adding the net energy gain to the net energy maintenance;
 calculating a feed conversion ratio for the one or more feeds by comparing the gross energy to the Arkansas net energy, wherein the conversion ratio is used to calculate energy requirements of the one or more feeds;
 calculating an energy requirement for the one or more broilers by correlating the percent total digestible lysine and percent total digestible essential amino acids of the one or more feeds to the feed conversion ratio,
 using the calculated energy requirement to determine an amount of the one or more foods to give to the broilers; and,
 feeding the broilers according to the determined amount of the one or more foods.

14. The process of claim 13 wherein the fasting heat production is measured with indirect calorimetry.

15. The process of claim 13 wherein the broilers are in a temperature-controlled environment.

16. The process of claim 13 wherein the gross energy, percent total digestible lysine, and the percent total digestible essential amino acids of the one or more feeds are measured with near infrared reflectance.

* * * * *